May 11, 1965
D. TANN
3,183,007
SEAL EMPLOYING OIL-IMPREGNATED WICKING
MATERIAL AND METHOD OF MAKING
Filed May 15, 1961
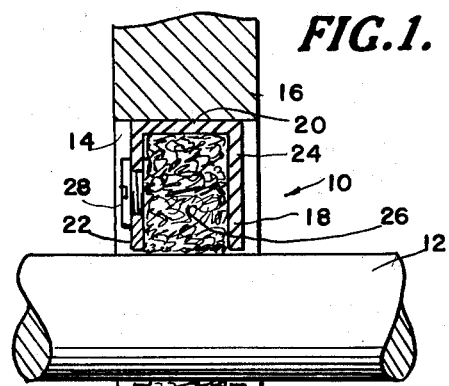
FIG.1.
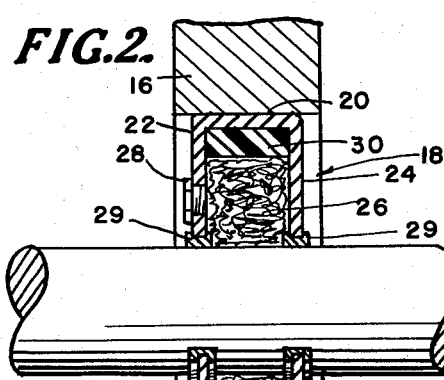
FIG.2.
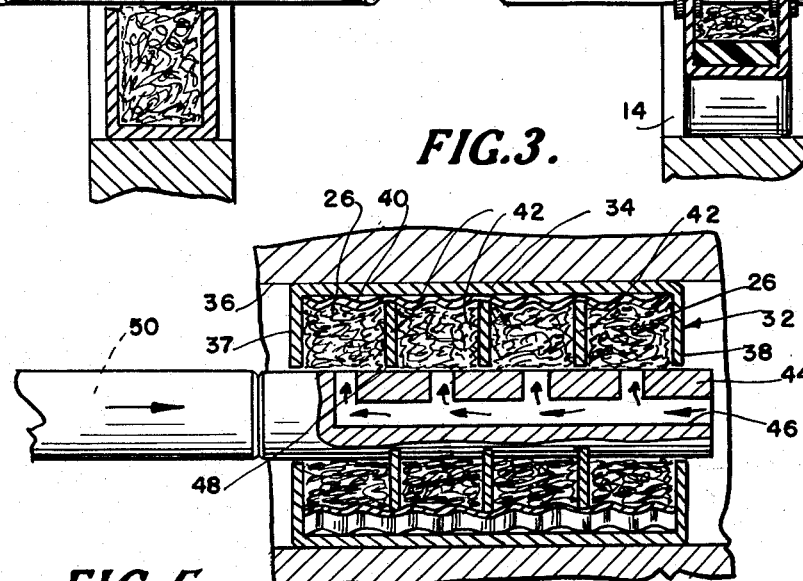
FIG.3.
FIG.5.
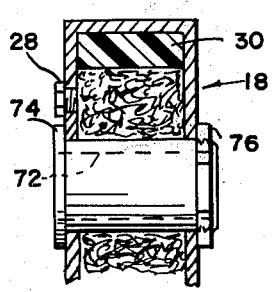
FIG.4.
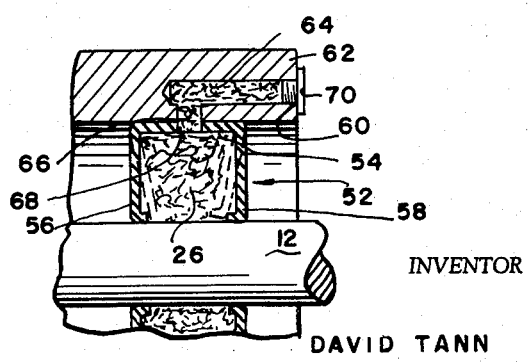
INVENTOR
DAVID TANN
BY *Lane & Aitken*
ATTORNEYS United States Patent Office 3,183,007
Patented May 11, 1965

3,183,007
SEAL EMPLOYING OIL-IMPREGNATED WICKING MATERIAL AND METHOD OF MAKING
David Tann, Detroit, Mich., assignor to Tann Corporation, Detroit, Mich., a corporation of Michigan
Filed May 15, 1961, Ser. No. 110,030
5 Claims. (Cl. 277—1)

The present invention relates to seals for movable members and more particularly to a seal having finely macerated, oil-impregnated wicking material directly engaging the movable member.

It is one object of the invention to provide a seal for movable members by holding finely macerated, oil-impregnated wicking material thereagainst.

It is another object of the invention to provide a sealing element having a reservoir therein filled with a macerated, oil-impregnated wicking material directly engaging the surface of a movable member to provide a seal thereagainst.

It is a further object of the invention to provide a seal by positioning a housing about a movable member to be sealed, and injecting finely macerated, oil-impregnated wicking material within the housing under pressure to conform to and seal against the surface of the movable member.

It is a still further object of the invention to provide a seal of the type described above wherein the oil-impregnated wicking material is maintained under pressure within the housing to maintain the material in sealing engagement with the surface of the movable member.

It is a still further object of the invention to provide a seal of the type described above wherein resilient means is positioned within the housing to maintain the aforementioned pressure on the oil-impregnated wicking material.

It is a still further object of the invention to provide a seal of the type described above wherein the walls of the housing provide an "oil can" effect to exert pressure directly on the oil-impregnated wicking material.

It is a still further object of the invention to provide an ecomonical, reliable and effective sealing element employing a finely macerated, oil-impregnated wicking material which can be readily replenished if necessary.

Other objects and features of novelty of the present invention will be specifically pointed out or will otherwise become apparent when referring, for a better understanding of the invention, to the following description taken in conjunction with the accompanying drawings, wherein:

FIG. 1 is a sectional view of a seal embodying features of the invention sealing against a rotatable or slidable shaft;

FIG. 2 is a sectional view similar to that of FIG. 1 illustrating a modification of the invention;

FIG. 3 is a sectional view similar to that of FIG. 1 illustrating still another modification of the invention along with means for injecting the finely macerated, oil-impregnated wicking material into the seal;

FIG. 4 is a sectional view similar to that of FIG. 1 illustrating still another modification of the invention; and FIG. 5 is a sectional view similar to that of FIG. 1 illustrating a package sealing element.

Referring to FIG. 1, a seal 10 embodying features of the invention is illustrated in position to seal against the surface of a rotatable or slidable shaft 12, the seal being mounted within an aperture 14 in a supporting frame or body 16. The seal 10 comprises an annular housing 18 having a cylindrical outer wall 20 and spaced end walls 22 and 24. The housing 19 defines as annular lubricant reservoir which is filled with a finely macerated, oil-impregnated wicking material 26 which engages the surface of the shaft 12 to provide the seal thereagainst. A very small clearance is preferably provided between the shaft and the inner edges of the end walls 22 and 24 so that they do not engage the surface of the shaft.

The oil-impregnated wicking material 26 is of the type disclosed in Abel Patent No. 2,966,459, issued December 27, 1960, and briefly comprises finely macerated, cellulose fibers impregnated with large quantities of a suitable bearing oil by weight, for example, up to ten parts of oil to one of fibers by weight. The material is such that it can be injected under pressure through small orifices into the lubricant reservoir without the oil separating from the cellulose fibers. The wicking material of the Abel patent will hereinafter be referred to in the specification and claims as "injectable wicking material."

In the embodiment illustrated in FIG. 1 a removable plug 28 is provided in the end wall 22 to enable the injectable wicking material to be injected into the housing 18 after the shaft 12 has been extended therethrough to close off the annular lubricant reservoir defined by the housing. Since the wicking material is injected under pressure it will completely fill the lubricant reservoir and conform exactly to the surface of the shaft 12 to prevent foreign matter and fluids at reasonable pressures from passing along the shaft from one side of the seal 10 to the other.

The material disclosed in the Abel patent has proved to be unexpectedly effective for this sealing application. It has a great affinity for the oil retained thereby and resists taking on or absorbing other fluids, such as water, so as to resist passage of the water therethrough to the other side of the seal. With this construction, a very effective seal is provided which does not create any appreciable frictional drag on the shaft 12 since the injectable wicking material of the Abel patent is substantially 90% oil by weight.

Referring to FIG. 2, a modification of the present invention is illustrated wherein a ring 30 of soft rubber or the like is positioned within the housing 18 against the cylindrical wall 20. When the injectable wicking material 26 is injected within the housing under pressure as previously described, it completely fills the lubricant reservoir and compresses the ring 30 so that the ring will thereafter exert a continuous resilient pressure on the wicking material to maintain it in direct engagement with the shaft 12. It would also be preferable that the ring 30 be impregnated with oil before inserting it in the housing. If desired, rings 29 of a suitable low friction material such as Teflon, for example, can be fixed to the inner edges of the end walls 22 and 24 in direct contact with the shaft, rather than providing the small clearance as illustrated in FIG. 1.

Referring to FIG. 3, still another modification of the present invention is illustrated which comprises a housing 32 having a cylindrical outer wall 34 supported within an aperture 36 of a suitable supporting body and having spaced end walls 37 and 38. A corrugated sleeve 40 is positioned within the housing against the wall 34 and a plurality of washer shaped spacer plates 42 are fitted within the housing with their outer edges clamping the sleeve 40 against the wall 34. The plates 42 are spaced axially of the housing so as to define a plurality of lubricant reservoirs, each filled with the injectable wicking material 26 under pressure so that the corrugated sleeve 40 is compressed and exerts a resilient force on the wicking material to maintain it in direct engagement with the shaft to be sealed.

There are of course several ways in which the wicking material can be injected into the lubricant reservoirs. In FIG. 3 this is done by a shaft 44 extending through the end walls 37 and 38 of the housing and having the same diameter as the shaft 50 to be sealed by the sealing element. The shaft 44 has an axially extending blind passageway 46 therein and a plurality of radially extending passageways 48 communicating with the passageway 46 in position to communicate with each of the separate lubricant reservoirs in the housing 32. The oil-impregnated wicking material is injected by suitable apparatus (not shown) into the passageway 46 and will flow through the radial passageways 48 into each of the lubricant reservoirs of the housing under pressure so as to completely fill each of the lubricant reservoirs and compress the corrugated sleeve 40. The shaft 44 can then be pushed out of the sealing element by a shaft 50, illustrated in phantom abutting against the left end of the shaft 44, so that the shaft 50 replaces the shaft 44 in a manner to enable the corrugated sleeve 40 to maintain its pressure on the wicking material.

With this construction the seal will provide an excellent seal for the shaft 50 and by making it longer with separate lubricant reservoirs, the seal will have a longer life and the possibility of contaminating liquids passing from one end of the seal to the other will be practically eliminated.

Referring to FIG. 4, another modification of the present invention is illustrated comprising a seal 52 having a cylindrical outer wall 54 and spaced end walls 56 and 58. The seal is positioned within an aperture 60 in supporting body 62 having a drilled passageway 64 therein communicating with a radial passageway 66 which in turn communicates with the aperture 60. The outer wall 54 of the seal is provided with a suitable aperture 68 aligned with the radial passageway 66 so that the injectable wicking material 26 can be injected through the body 62 directly into the seal, and a plug 70 thereafter inserted to close off the passageway 64. The end walls 56 and 58 normally are depressed inwardly before the injectable wicking material is filled therein and are resiliently moved or flexed outwardly by the injectable wicking material as it fills the housing to provide an "oil can" effect so that the end walls exert a continuous pressure on the injectable wicking material to maintain it in direct engagement with the shaft 12.

Referring to FIG. 5, a package seal is illustrated which is the same as the seal of FIG. 2 with the exception that a sleeve 72 having a flange 74 on the left end thereof is positioned to close off the annular reservoir within the housing 18. A suitable locking flange 76 is removably secured to the right end of the sleeve to retain it in position. With this construction, the injectable wicking material can be injected into the closed-off reservoir to compress the ring 30, as previously described. This provides a package seal that can be shipped and stored until ready for use. To install the seal, the locking flange is removed and the shaft to be sealed used to push out and replace the seal 72 in a similar manner as described in connection with FIG. 3. Alternatively, the sleeve 72 can be removed and the wicking material 26 permitted to be expanded slightly into the central aperture by the ring 30. The shaft to be positioned in the seal can then be preceded by a tapered shaft to push the injectable wicking material back into the reservoir and compress the ring 30. Of course the largest diameter of the tapered shaft would be the same as the diameter of the shaft to be sealed.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A sealing element for sealing against the surface of a shaft comprising a cylindrical housing having a pair of axially spaced end walls, a shaft extending axially through said end walls, a compressible sleeve positioned within said housing against the cylindrical surface thereof, a plurality of axially spaced washer-shaped partitions surrounding said shaft in position to divide the housing into a plurality of separate compartments with said compressible sleeve forming the periphery of each of said compartments, and an injectable oil-impregnated wicking material completely filling each of said compartments and compressing said sleeve whereby the sleeve will exert a continuous pressure on the wicking material in each compartment to ensure a good seal against the surface of said shaft.

2. The invention as defined in claim 1 wherein said compressible sleeve is a sleeve of resilient material.

3. The method of forming a seal against the surface of a shaft, which includes the steps of, positioning a housing about said shaft in a manner to define an enclosed annular lubricant reservoir about the shaft, said shaft having passageway means therein communicating with said reservoir and communicating with a surface of the shaft outside of the housing, injecting an oil-impregnated wicking material through said passageway means into said reservoir, and displacing said shaft with an operating shaft having the same diameter whereby the oil-impregnated wicking material will seal against the surface of said operating shaft.

4. The method of forming a seal against the surface of a movable member, which includes the steps of, positioning a housing adjacent to the surface of the movable member so as to cooperate with said surface to define a lubricant reservoir, positioning a compressible element within said housing against a wall thereof, and injecting an injectable wicking material into said lubricant reservoir under pressure to completely fill the reservoir and compress said compressible element.

5. The method of forming a seal against the surface of a shaft, which includes the steps of, positioning a housing about said shaft in a manner to define an enclosed annular lubricant reservoir about the shaft, dividing said lubricant reservoir into a plurality of axially spaced annular lubricant compartments, said shaft having an axially extending passageway therein and a plurality of axially spaced radially extending passageways each communicating with said axially extending passageway and a different one of said lubricant compartments, injecting an oil-impregnated wicking material through said passageways into each of said lubricant compartments, and displacing said shaft with an operating shaft having the same diameter whereby the oil-impregnated wicking material in each compartment will seal against the surface of said operating shaft.

References Cited by the Examiner
UNITED STATES PATENTS

| | | | |
|---|---|---|---|
| 470,303 | 3/92 | Martin | 277—69 |
| 470,305 | 3/92 | Martin | 288—18 XR |
| 1,776,911 | 10/30 | Jones | 286—18 XR |
| 1,893,961 | 1/33 | Robbins | 286—38 |
| 1,914,741 | 6/33 | Gysling | 277—34 |
| 1,991,714 | 2/35 | Wheeler | 277—1 |
| 2,187,733 | 1/40 | De Juasz | 286—38 |
| 2,772,900 | 12/56 | Campbell | 277—165 |
| 2,908,176 | 10/59 | Brueggeman. | |
| 2,966,459 | 12/60 | Abel | 252—14 |

EDWARD V. BENHAM, *Primary Examiner.*

MORRIS M. FRITZ, DONALD R. SCHRAN,
*Examiners.*